(12) United States Patent
Tupala et al.

(10) Patent No.: US 8,411,737 B2
(45) Date of Patent: Apr. 2, 2013

(54) TRANSMISSION OF PHYSICAL LAYER SIGNALING IN A BROADCAST SYSTEM

(75) Inventors: Miika Sakari Tupala, Turku (FI); Pekka Talmola, Turku (FI); Jussi Kalevi Vesma, Turku (FI); Tero Tapio Jokela, Turku (FI)

(73) Assignee: Nokia Corporation, Espoo (FI)

( * ) Notice: Subject to any disclaimer, the term of this patent is extended or adjusted under 35 U.S.C. 154(b) by 458 days.

(21) Appl. No.: 12/398,680

(22) Filed: Mar. 5, 2009

(65) Prior Publication Data

US 2010/0226426 A1   Sep. 9, 2010

(51) Int. Cl.
*H04N 11/02* (2006.01)

(52) U.S. Cl. .................................. 375/240.01

(58) Field of Classification Search .................. None
See application file for complete search history.

(56) References Cited

U.S. PATENT DOCUMENTS

| | | | |
|---|---|---|---|
| 6,522,665 B1 | 2/2003 | Suzuki et al. | |
| 6,804,257 B1 * | 10/2004 | Benayoun et al. | 370/471 |
| 2004/0022231 A1 | 2/2004 | Morrish et al. | |
| 2004/0054960 A1 * | 3/2004 | Eroz et al. | 714/800 |
| 2006/0195752 A1 | 8/2006 | Walker et al. | |
| 2008/0148135 A1 * | 6/2008 | Hughes et al. | 714/799 |
| 2008/0225982 A1 | 9/2008 | Chrabieh et al. | |
| 2009/0164873 A1 * | 6/2009 | Pekonen et al. | 714/776 |
| 2010/0131829 A1 * | 5/2010 | Sun et al. | 714/776 |

FOREIGN PATENT DOCUMENTS

EP   0944199 A1   9/1999

OTHER PUBLICATIONS

Anonymous, DVB Bluebook A122, "Frame Structure channel coding and modulation for a second generation digital terrestrial television broadcasting system (DVB-T2)", Online, Jun. 2008, pp. 1-158.*
"Digital Video Broadcasting (DVB); Frame structure channel coding and modulation for a second generation digital terrestrial television broadcasting system (DVB-T2)", DVB Document Draft ESTI EN 302 755 V1.1.1_0.2, Oct. 2008, pp. 1-166.
DVB, "Frame structure channel coding and modulation for a second generation digital terrestrial television broadcasting system (DVB-T2)," Jun. 2008, pp. 50-69, DVB Document A122, TM 3980, Rev. 5.
International Search Report for related PCT Application No. PCT/IB2010/050568, Jun. 23, 2010, pp. 1-5.
Office Action for EP Patent Application No. 08807775.5, dated Jul. 12, 2011.
International Search Report for PCT/IB2008/053872, dated Mar. 18, 2009.
International Preliminary Report on Patentability and Written Opinion for PCT/IB2008/053872 dated Mar. 30, 2010.

* cited by examiner

*Primary Examiner* — Thai Tran
*Assistant Examiner* — Sunghyoun Park
(74) *Attorney, Agent, or Firm* — Banner & Witcoff, Ltd.

(57) ABSTRACT

Aspects of the invention provide apparatuses, computer media, and methods for supporting the broadcast of extended signaling data over a network. With an aspect of the invention, all of the extended signaling data may be distributed over multiple data frames. With another aspect, only dynamic signaling redundancy data is distributed over different data frames, where systematic information (for example, configurable signaling data) is transmitted in accordance with traditional systems. In addition, backwards compatibility with traditional systems may be supported, in which extended signaling is contained in an extension field. Error correction code may be applied to the extended signaling in concert with different codes. With another aspect, only extended signaling is supported without backwards compatibility with traditional systems.

37 Claims, 16 Drawing Sheets

TRANSMISSION OF PHYSICAL LAYER SIGNALING IN A BROADCAST SYSTEM

BACKGROUND

Digital Video Broadcasting (DVB) systems distribute data using a variety of approaches, including satellite (DVB-S, DVB-S2 and DVB-SH), DVB-SMATV for distribution via Satellite Master Antenna Television (SMATV)), cable (DVB-C), terrestrial television (DVB-T, DVB-T2), and digital terrestrial television for handhelds (DVB-H, DVB-SH). The associated standards define the physical layer and data link layer of the distribution system. Devices interact with the physical layer through a synchronous parallel interface (SPI), synchronous serial interface (SSI), or asynchronous serial interface (ASI). Data is transmitted in Moving Pictures Experts Group-2 (MPEG-2) transport streams with some additional constraints (DVB-MPEG).

The distribution systems for the different DVB standards differ mainly in the modulation schemes used and error correcting codes used, due to the different technical constraints. For example, DVB-S (SHF) uses Quaternary Phase Shift Keying (QPSK), 8PSK or 16-QAM. DVB-S2 uses QPSK, 8PSK, 16APSK or 32APSK, based as a broadcaster's option. QPSK and 8PSK are the only versions regularly used. DVB-C (VHF/UHF) uses Quadrature Amplitude Modulation (QAM): 16-QAM, 32-QAM, 64-QAM, 128-QAM or 256-QAM. DVB-T (VHF/UHF) uses 16-QAM or 64-QAM (or QPSK) in combination with Coded Orthogonal Frequency-Division Multiplexing (COFDM) and can support hierarchical modulation.

The DVB-T2 standard ("Frame structure channel coding and modulation for a second generation digital terrestrial television broadcasting system (DVB-T2)," DVB Draft ETSI EN 302 755, V1.1.1_0.2, October 2008) is an update for DVB-T to provide enhanced quality and capacity. It is expected that the DVB-T2 standard will provide more-robust TV reception and increase the possible bit-rate.

SUMMARY

An aspect of the invention provides apparatuses, computer-readable media, and methods for supporting the broadcast of extended signaling data over a network. With an aspect of the invention, all of the extended signaling data may be distributed over multiple data frames. With another aspect, only dynamic signaling redundancy (parity) data is distributed over different data frames, where systematic information (for example, configurable signaling data) is transmitted in accordance with traditional systems. In addition, backwards compatibility with traditional systems may be supported, in which extended signaling is contained in an extension field. Error correction codes may be applied to the extended signaling in concert with different codes. With another aspect, only extended signaling is supported without backwards compatibility with traditional systems.

With another aspect of the invention, a signaling component including a dynamic signaling part is obtained, where the signaling component contains parameters for decoding a data stream, and the dynamic signaling part is susceptible to change over a plurality of data frames. The dynamic signaling part is then encoded and divided into a plurality of dynamic signaling segments. The dynamic signaling segments are then interleaved over a plurality of data frames in order to achieve a desired degree of time diversity.

With another aspect of the invention, dynamic signaling segments are inserted into an extension field of each data frame as indicated by a signaling indicator.

With another aspect of the invention, a dynamic signal part is encoded and the resulting redundancy data is divided into a plurality of dynamic signaling segments. The plurality of dynamic signaling segments is then distributed over a plurality of data frames.

BRIEF DESCRIPTION OF THE DRAWINGS

A more complete understanding of the exemplary embodiments the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
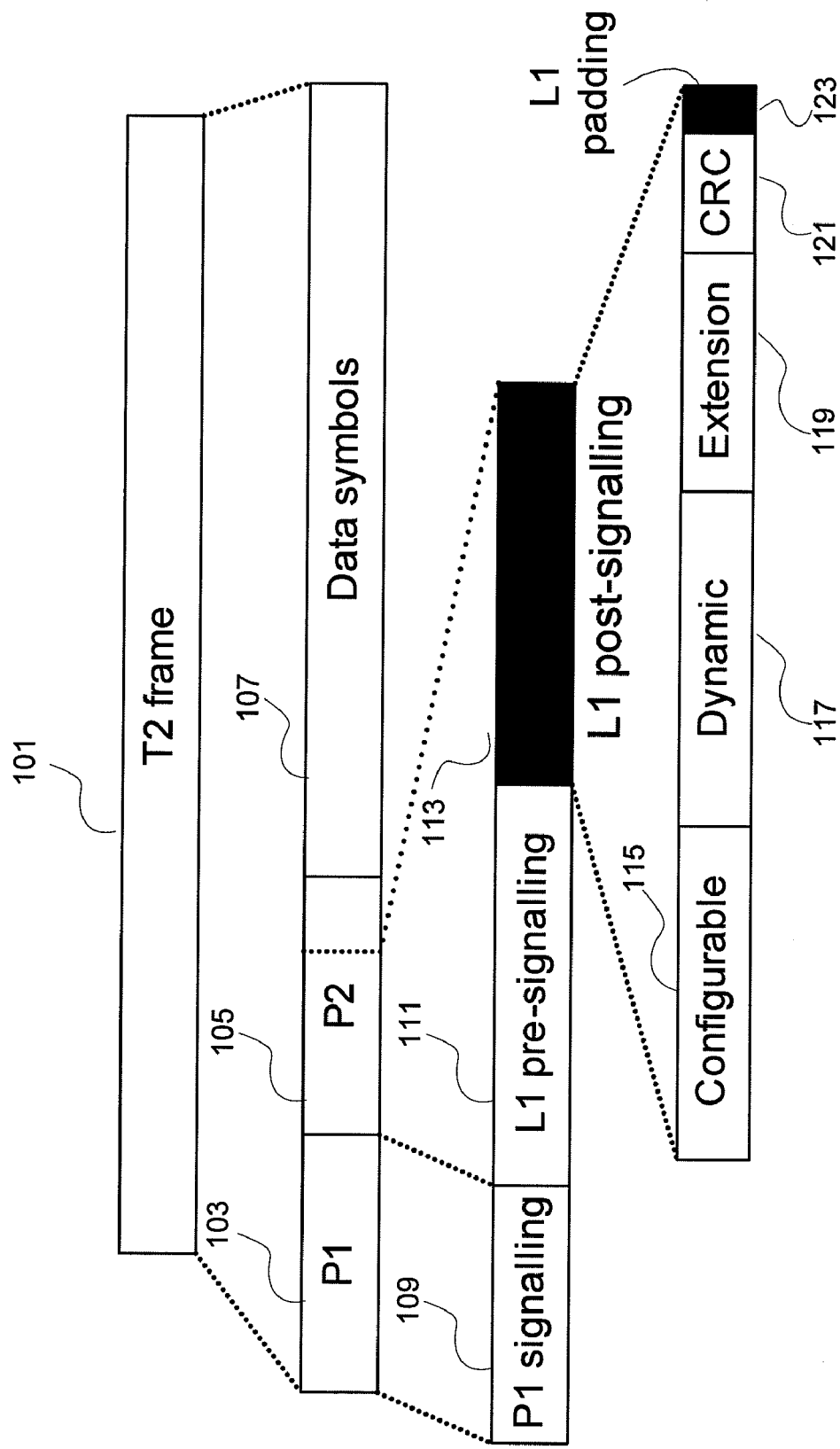
FIG. 1 shows exemplary physical layer (L1) signaling transmission in T2 frames.

FIG. 1 shows an exemplary layer 1 (L1) signaling transmission in T2 frame 101 corresponding to the physical layer. The physical layer is the first (for example the lowest) level in the seven-layer OSI model. The physical layer translates communications requests from the data link layer into hardware-specific operations to effect transmission or reception of electronic signals. The bit stream may be grouped into code words or symbols and converted to a physical signal that is transmitted over a wired or wireless transmission medium.

Each frame 101 may contain one P1 symbol 103, P2 symbol 105, and data symbols 107. (Each frame includes only one P1 symbol, although embodiments may include a plurality of P1 symbols.) P1 symbol 103 may be a fixed pilot symbol that carries P1 signaling information 109 and may be located in the beginning of frame 101 within each RF-channel. P1 symbol 103 may be used for a fast initial signal scan. P2 symbols 105 may be pilot symbols located right after P1 symbol 103 with the same Fast Fourier Transformation (FFT) size and guard interval as the data symbols. P2 symbols carry L1 pre-signaling information 111 and L1 post-signaling information 113. The number of P2 symbols depends on the FFT-size. P2 symbols 105 may be used for fine frequency and timing synchronization as well as for initial channel estimates. Data symbols 107 may be OFDM symbols in frame 101 that may not be P1 or P2 symbols. Data symbols 107 convey data content that may be associated with different physical layer pipes (PLPs). T2 frames may be further grouped into super frames, consisting of selected number of frames.

L1 signaling may be divided into pre-signaling (L1-pre) 111 and post-signaling 113, where L1-pre 111 acts as a key for receiving L1 post-signaling 113 including the PLP mappings.

L1 post-signaling 113 may be further divided into configurable part 115 and dynamic part 117, where configurable parameters comprise static signaling data that may change only at a super frame border. Configurable parameters change only when the system configuration may be changed (for example, when PLPs may be added or removed). Dynamic parameters refer to the mapping of each PLP to T2 frame 101 and may change from frame to frame. Configurable and dynamic parts 115 and 117 of L1 post-signaling 113 may be transmitted in the same code words.

L1 post-signaling 113 may also include optional extension field 119 that allows for expansion of L1 post-signaling. CRC (cyclic redundancy check) 121 provides error detection of any errors that may occur in L1 post-signaling 113. A 32-bit error detection code may be applied to the entire L1 post-signaling 113 including configurable part 115, dynamic part 117, and extension part 119. L1 padding 123 may be a variable-length field that may be inserted following the L1 post-signaling CRC field 121 to ensure that multiple LDPC (Low Density Parity Check) blocks of the L1 post-signaling have the same information size when the L1 post-signaling may be segmented into multiple blocks and when these blocks may be separately encoded. L1-padding also makes the total size of the L1 post-signaling an integer multiple of the number of P2 symbols. The values of the L1 padding bits, if any, may be set to a fix value for example "0".

Different PLPs may have different coding and modulation parameters. The information on how to decode the different PLPs may be signaled in the physical layer signaling. L1 signaling may be transmitted in a preamble consisting of P2 OFDM symbols. In DVB-T2, the number of P2 symbols may be fixed for the used FFT size. Therefore, the capacity of the P2 symbols limits the maximum number of PLPs that can be signaled in the L1 signaling. The number of PLPs that can be signaled with FFT sizes smaller than 32 k when L1-dyn repetition may be used for different L1 signaling modulation schemes is: 14 PLPs (BPSK), 31 PLPs (QPSK), 64 PLPs (16-QAM), and 97 PLPs (64-QAM). L1-dyn repetition may be a signaling option where the dynamic signaling for the frame m may not be sent only in P2 symbols of frame m but also in P2 symbols of frame m−1. Therefore, when the repetition may be used, each frame carries the L1-dyn for the current and the next frame.

Figure 2:
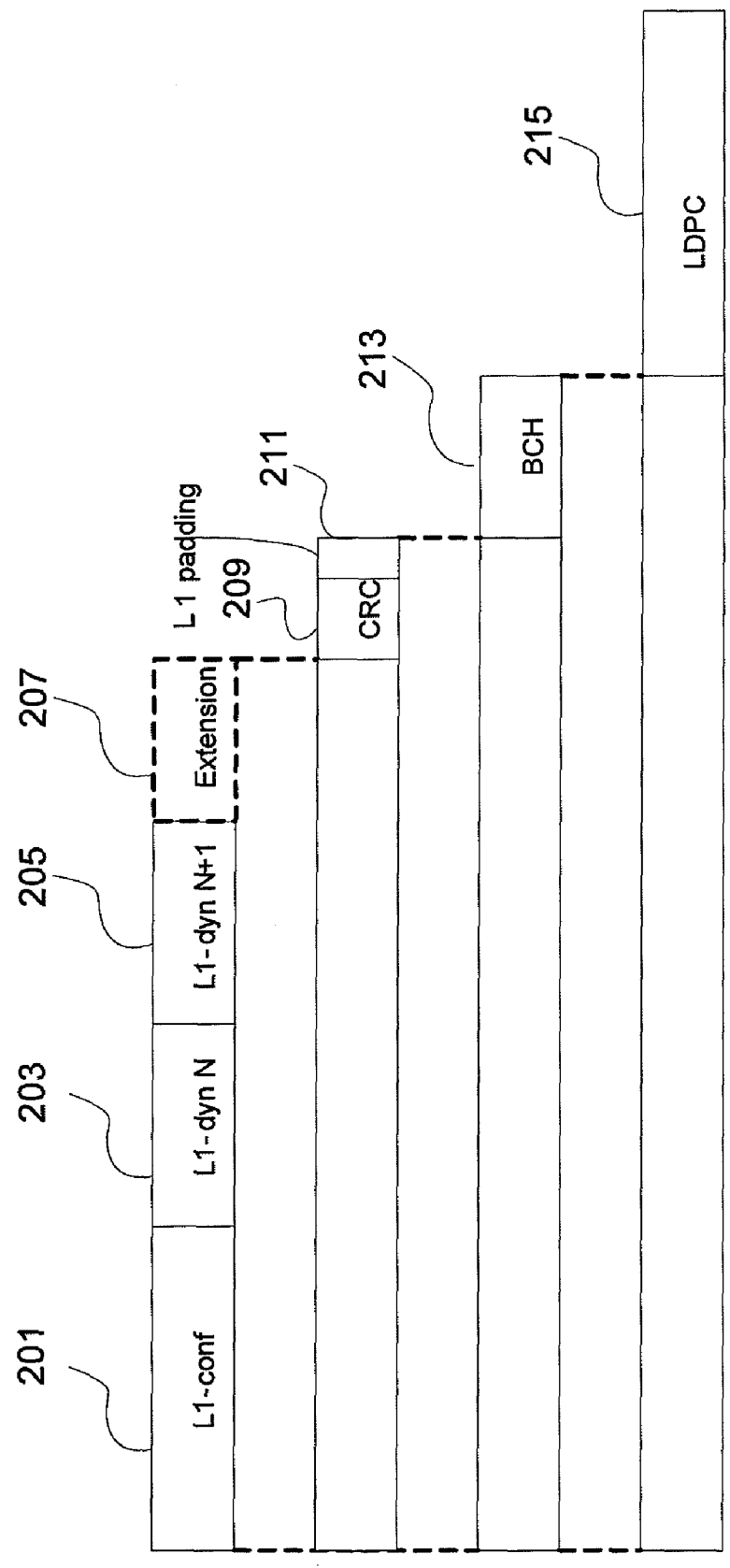
FIG. 2 shows exemplary L1 signaling encoding.

FIG. 2 shows an exemplary L1 signaling encoding. L1 signaling data (including configurable part 201, dynamic parts 203 and 205, extension field 207, CRC 209, and padding 211) may be further encoded with Bose-Chaudhuri-Hocquenghem (BCH) field 213 and Low Density Parity Check (LDPC) field 215, which provide further error protection of L1 post-signaling.

Figure 3:
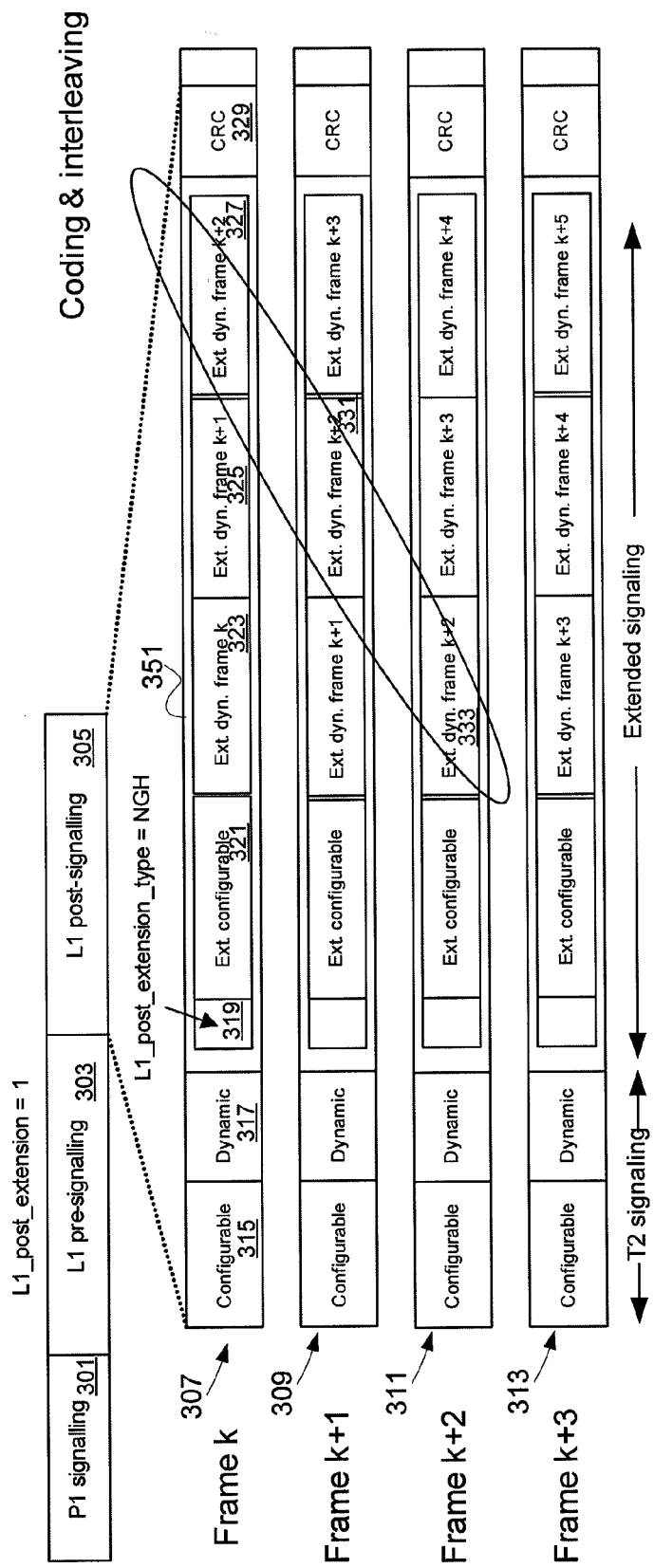
FIG. 3 shows signaling information in an L1 post-signaling extension field in accordance with an exemplary embodiment of the invention.

L1-dynamic part 203 and 205 can signal PLP to frame mappings either for only the current frame or optionally for both the current frame and the next frame. In the former case only the L1-dynamic part 203 may be present, whereas in the latter case also the L1-dynamic part 205 may be included. In both cases, the entire L1 post-signaling may be handled as one block as shown in FIG. 3. CRC 209 may be calculated over configurable part 201, dynamic parts 203, optional dynamic part 205, and optional extension part 207 of L1 post-signaling. BCH and LDPC codes may be further used for error correction and detection. BCH field 213 and LDPC 215 may be coded over configurable part 201, dynamic parts 203 and 205, extension part 207, CRC 209, and possible L1 padding 211. Consequently, an error anywhere in L1 post-signaling may result in discarding all parts of the L1 post-signaling at the receiver as it may not be known whether the entire received L1 post-signaling information may be corrupted or whether some portions of the received L1 post-signaling information may not be corrupted.

For example, if the receiver may only be interested in dynamic information corresponding to a set of PLPs for a desired service, the receiver may use L1 dynamic information received as part of an L1 post-signaling block containing some errors if the receiver could ascertain that the error may be in other parts of L1 post-signaling. Similarly, in case the dynamic part includes signaling for both current and next frame PLP to frame mapping, the receiver could continue receiving data from current frame if the error were known to be in the part of signaling associated with the next frame.

The approach shown in FIG. 2, where the L1 post-signaling may be encoded as one block, generally does not support different degrees of robustness for different parts of the L1 post-signaling.

There may be several aspects of the invention. With one aspect, all of the extended (enhanced) signaling (for example the Next Generation Handheld (NGH)) may be distributed over multiple data frames (corresponding to FIG. 3). With another aspect, only the parity (redundancy) data may be distributed over different data frames (corresponding to FIGS. 8 and 9), where systematic information (for example, configurable signaling data) may be transmitted in accordance with traditional systems. In addition, backwards compatibility with traditional systems may be supported, in which extended signaling may be contained in an extension field. Error correction codes may be applied to the extended signaling information in concert with different coding schemes (for example, code rate 1/5 or 4/9 LDPC code and concatenated with a BCH code) so that redundancy data can be included with the signaling information. For example, BCH field 513 and LDPC field 515 may be determined from dynamic signaling information 503 as will be further discussed with FIG. 5. With another aspect, only extended signaling (corresponding to FIG. 13) may be supported without backwards compatibility with traditional systems.

Redundancy data (which may be referred as parity data even though encoding utilizes a cyclic redundancy code or some other type of code) may be included with signaling information in order to detect and/or correct errors that may occur when the signaling information may be transmitted over a communication channel. Redundancy data may be obtained by applying different encoding algorithms to the signaling information, for example BCH coding and LDPC coding.

FIG. 3 shows exemplary signaling information in an L1 post-signaling extension field in accordance with an exemplary embodiment of the invention. With an aspect of the invention, extension field 351 (as shown in FIG. 3) provides a more robust signaling channel with respect to traditional systems.

Each T2 frame (frames 307, 309, 311, and 313) has a preamble with P1 and P2 symbols. P1 signaling 301 may be needed only during initial service discovery, and the majority of the signaling data may be associated with the P2 symbols. L1 pre-signaling 303 may be a constant field that enables reception of the L1 post-signaling. L1 post-signaling 305 includes all parameters needed to access the data. L1 post-signaling 305 has configurable part 315 that may be constant during a DVB-T2 super frame and dynamic part 317 that changes from data frame to data frame. Robust signaling of dynamic part 317 should be correctly received for every T2 frame because of its dynamic nature. Robust signaling of other signaling data may not be as important since the same information may be repeated in every T2 frame when the system configuration remains unchanged.

With an aspect of the invention, extension field 351 in L1 post-signaling field 305 provides an enhancement for the transmission of extended signaling services. As will be further discussed, time diversity of the dynamic signaling may be increased (resulting in increased communication robustness) by dividing the transmitted signaling data over several preambles (data frames) and applying coding and interleaving over this block of data frames.

With an aspect of the invention, extended signaling (for example, corresponding to a DVB-NGH system) may be backwards compatible with traditional signaling (corresponding to DVB-T2 services). DVB-T2 services may be signaled in the configurable and dynamic L1 post-signaling in concert with DVB-T2 specifications. However, DVB-T2 receivers do not need to be aware of the extended signaling (NGH services). The presence of extended signaling may be indicated by L1_post_extension flag 319, which may be used as a signaling indicator.

The contents and structure of extended signaling may be independent of the DVB-T2 signaling. As shown in FIG. 3, extended signaling includes extended configurable field 321 and multiple extended dynamic fields 323, 325, and 327. The purpose of extended configurable part 321 may be the same as that of traditional configurable part 315, but new extended signaling specific parameters can be defined in extension field 351 as discussed further below. Extension field 351 starts with type field L1_POST_EXTENSION_TYPE 319 to enable other signaling extensions to the DVB-T2 system.

An aspect of the invention may be to distribute the extended dynamic signaling over different T2 frames (for example, different preambles).

FIG. 3 shows four consecutive T2 frames (from k to k+3 corresponding to data frames 307, 309, 311, and 313, respectively) that may be included in an L1 signaling transmission. For example, extended dynamic signaling may be distributed over three T2 data frames, although a different number of data frames may be supported. The signaling fields 327, 331, and 333 (as circled) collectively provide signaling for data frame 311 (k+2). Coding and interleaving may be applied over the three data frames (blocks) to benefit from time diversity. Moreover, extended configurable signaling can be encoded, split and transmitted over several frames to obtain time diversity and to save capacity.

Encoding spanning the entire data frame may be further applied. For example, CRC field 329 encodes configurable signaling 315, dynamic signaling 317, and extension field 351. Additional encoding may be applied using BCH and LDPC encoding (not explicitly shown in FIG. 3 but shown in FIG. 5).

Figure 4:
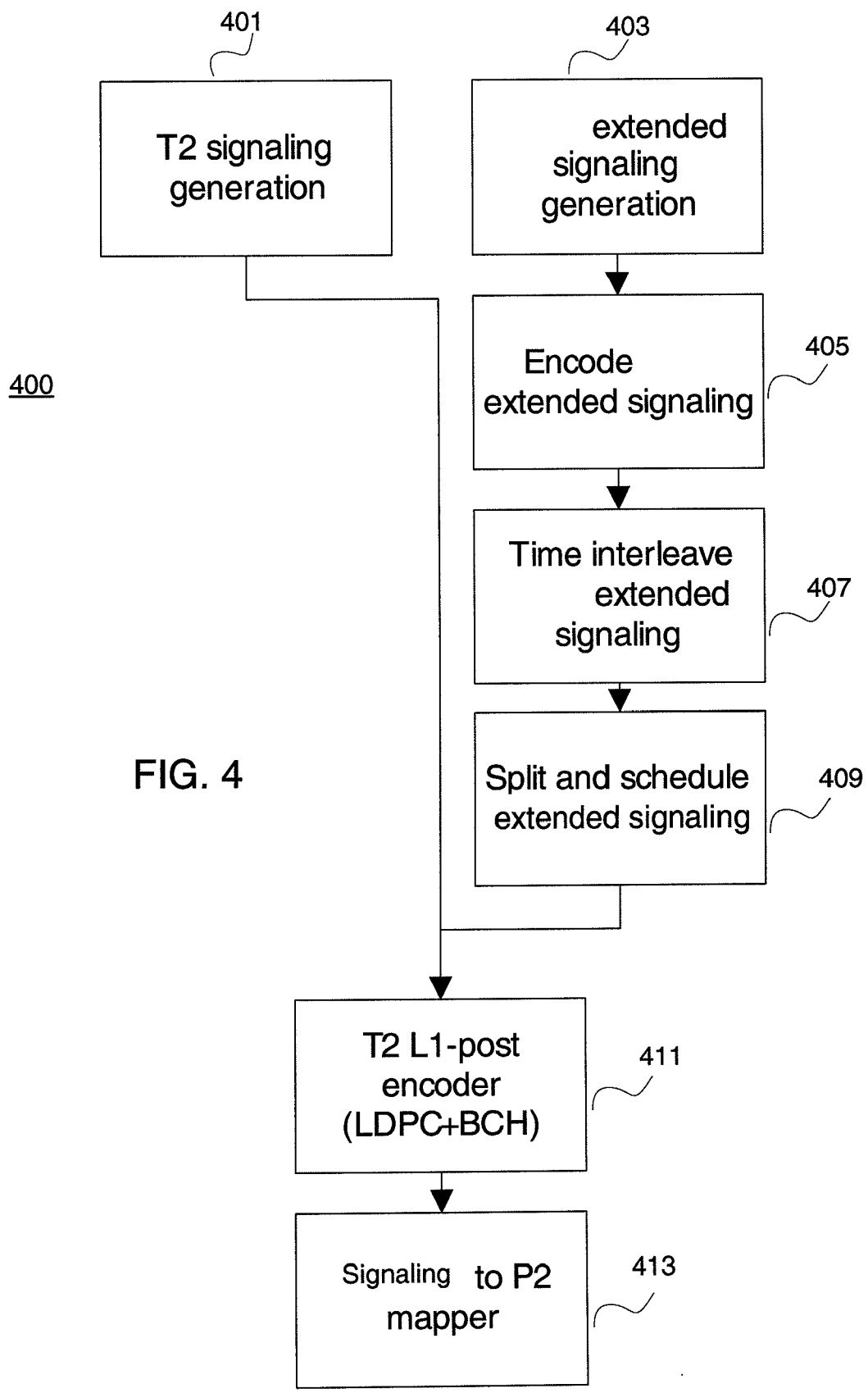
FIG. 4 shows a flow diagram for signaling as shown in FIG. 3 in accordance with an exemplary embodiment of the invention.
Figure 5:
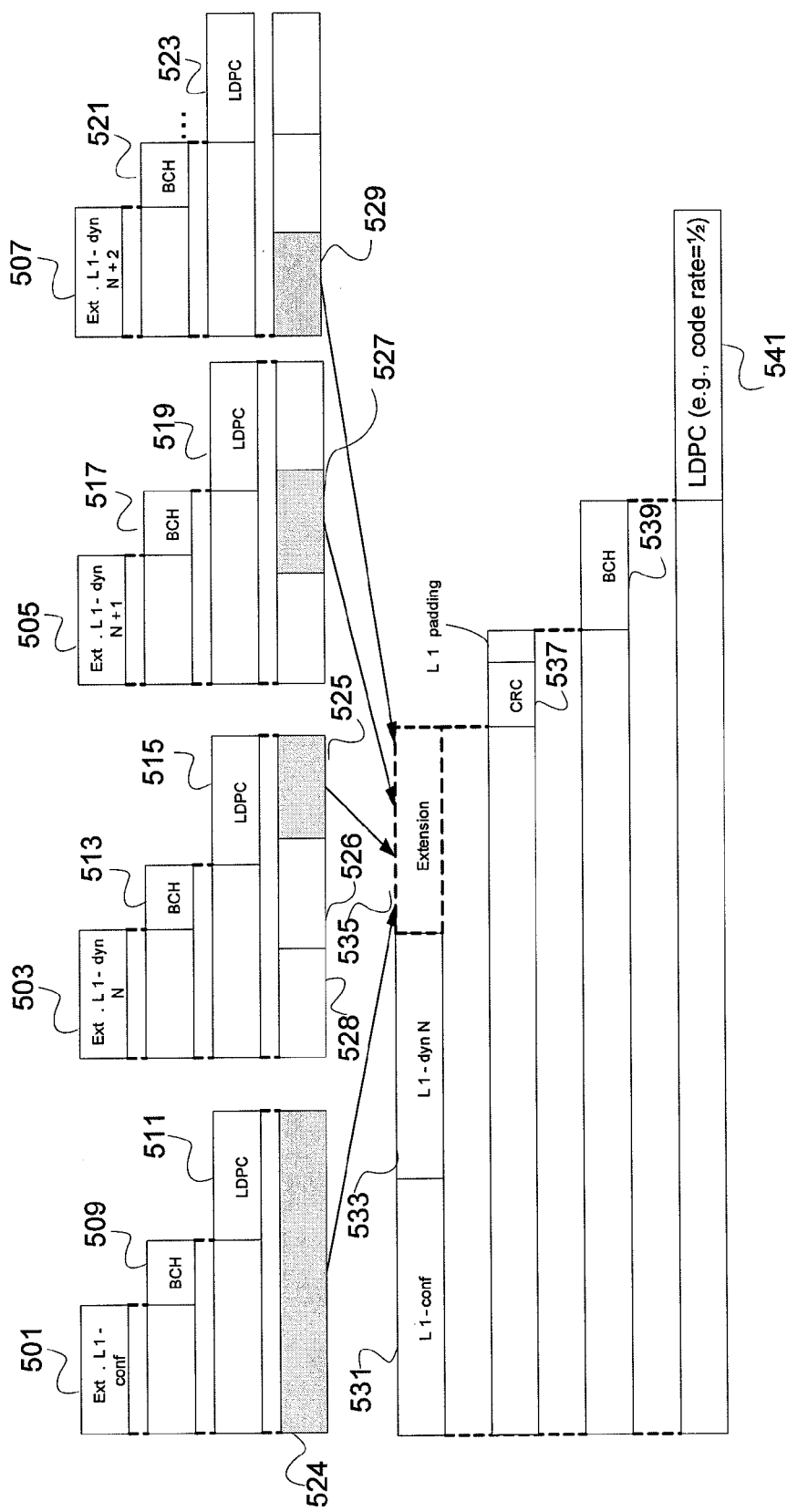
FIG. 5 shows a mapping for signaling as shown in FIG. 3 in accordance with an exemplary embodiment of the invention.

FIG. 4 shows flow diagram 400 for signaling as shown in FIG. 3 in accordance with an exemplary embodiment of the invention. Flow diagram 400 supports compatibility with both extended signaling as well as traditional signaling. In step 401, DVB-T2 signaling may be generated corresponding to fields 315 and 317 as shown in FIG. 3. Extended signaling may be generated in steps 403, 405, 407, and 409 corresponding to fields 319, 321, 323, 325, and 327. In step 405, signaling information may be encoded according a desired encoding scheme. For example, as shown in FIG. 5, dynamic signaling redundancy data (BCH field 513 and LDPC field 515) may be determined by encoding dynamic signaling data 503. In step 407, the dynamic signaling data (signaling information and redundancy data: 503, 513, and 515) may be interleaved and divided so that portions can be distributed over a plurality of data frames in step 409. For example, signaling data (dynamic signaling information 503 and redundancy data 513 and 515) may be partitioned into three portions (528, 526, and 525). The different portions may be distributed over a plurality of data frames. For example, last (third) portion 525 may be included in the current data frame ($N^{th}$) while first portion 528 and second portion 526 may be included in the previous two data frames (not shown in FIG. 5). In step 411, the data frame may be encoded spanning both DVB-T2 signaling data and extended signaling. The encoded signaling data may be subsequently mapped to P2 symbols in step 413.

FIG. 5 shows a mapping for signaling as shown in FIG. 3 in accordance with an exemplary embodiment of the invention. Segment 524 (corresponding to encoded configurable signaling data (501, 509, 511)), segment 525 (corresponding to the last part of encoded dynamic data of frame N (503, 513, and 515)), segment 527 (corresponding to the second portion of encoded dynamic data of frame N+1 (505, 517, and 519)), and segment 529 (corresponding to the first portion of encoded dynamic data of frame N+2 (507, 521, and 523)) may be inserted into extension field 535 to provide interleaving for time diversity over three data frames. The example shown in FIG. 5 distributes extended signaling data over a plurality of data frames, while the entire extended configurable field 524 may be transmitted in every data frame. However, with other embodiments, extended configurable signaling may be split over a plurality of data frames.

In addition, CRC field 537, BCH field 539, and LDPC field 541 provide redundancy data over configurable signaling data 531, dynamic signaling data 533, and extension data 535, in which the resulting redundancy data spans fields 531, 533, and 535. Consequently, redundancy data may be provided for specific signaling fields (as discussed above) as well as over the entire L1 post-signaling data, thus providing additional robustness.

Figure 6:
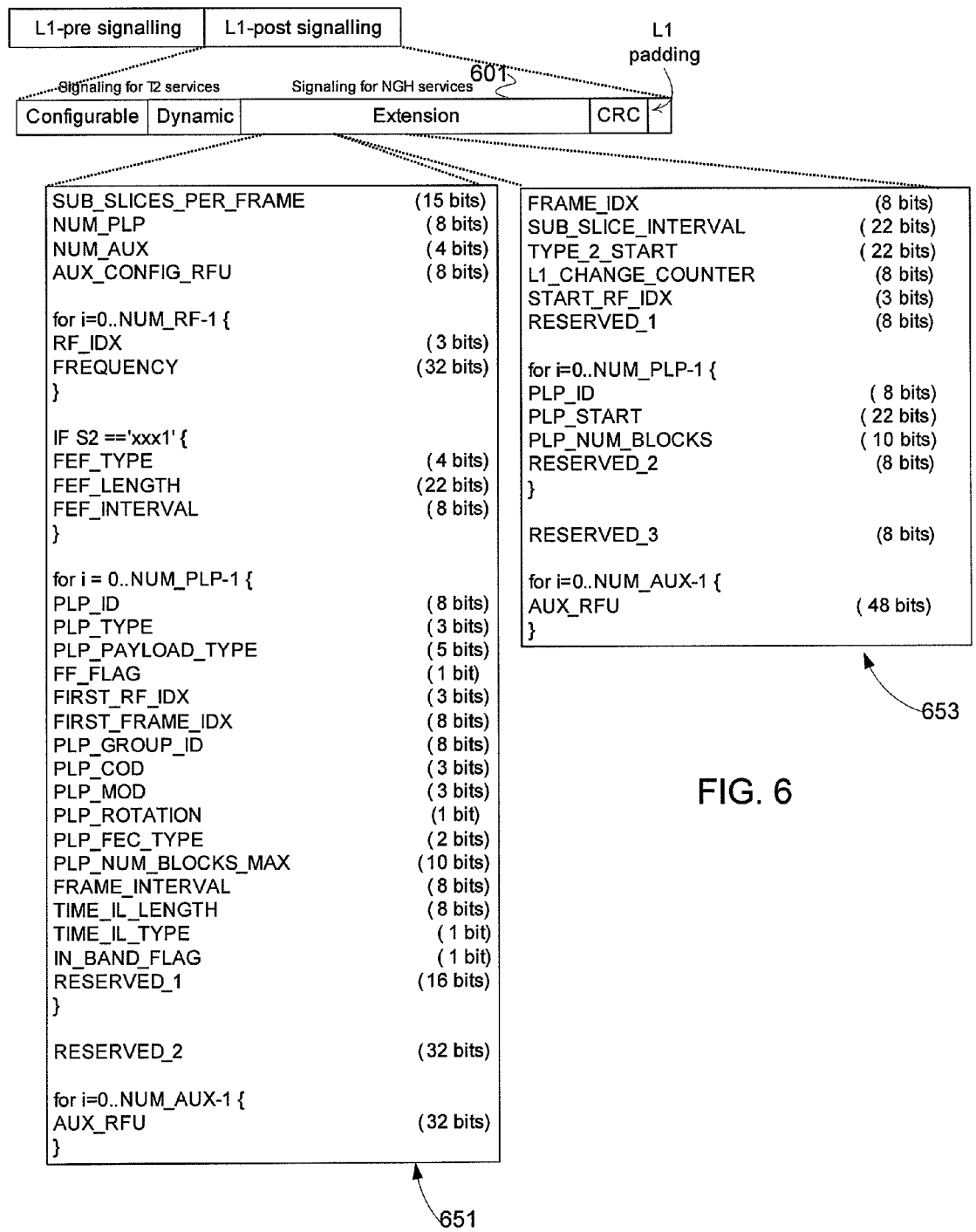
FIG. 6 shows signaling content for signaling as shown in FIG. 3 in accordance with an exemplary embodiment of the invention.

FIG. 6 shows signaling content for signaling as shown in FIG. 3 in accordance with an exemplary embodiment of the invention. Because the size of the L1 post-signaling extension fields may be the same for all data frames (for example in a T2 super frame), the locations of the extended dynamic blocks may be known to the receiver. Thus, even if DVB-T2 signaling may be lost, the extended signaling can still be extracted. Alternatively, the sizes of the dynamic blocks can be signaled in the previous frames. Consequently, signaling parameters may be contained in the extension field in concert with extended signaling as well as in conventional DVB-T2 signaling.

Signaling parameters listed in lists 651 and 653 may be included in extension field 601. New signaling parameters may be specified and included in extension field 601 for extended signaling services (not shown in FIG. 6). Exemplary new parameters include:

L1_POST_EXT_CHANGE_FLAG indicates changes in dynamic signaling. This parameter can be used to indicate that the L1-dynamic signaling will not change during a predetermined period. The time period may be, for example a T2 super frame. Alternatively, a change counter, which indicates the number of frames to the next change, could be used.

NUM_EXT_DYN_BLOCKS signals the number of extended dynamic blocks, which may be equal to the number of preambles where the dynamic signaling may be distributed. This value may be also fixed, so there may not be a need to signal this.

SIZE_EXT_BLOCKS loop signals the size of the extended configurable and dynamic blocks. The number of loops may be equal to NUM_EXT_DYN_BLOCKS+1.

RF loop can be used for signaling the frequencies of neighboring cells, not for time-frequency slicing (TFS) as in T2.

Figure 7:
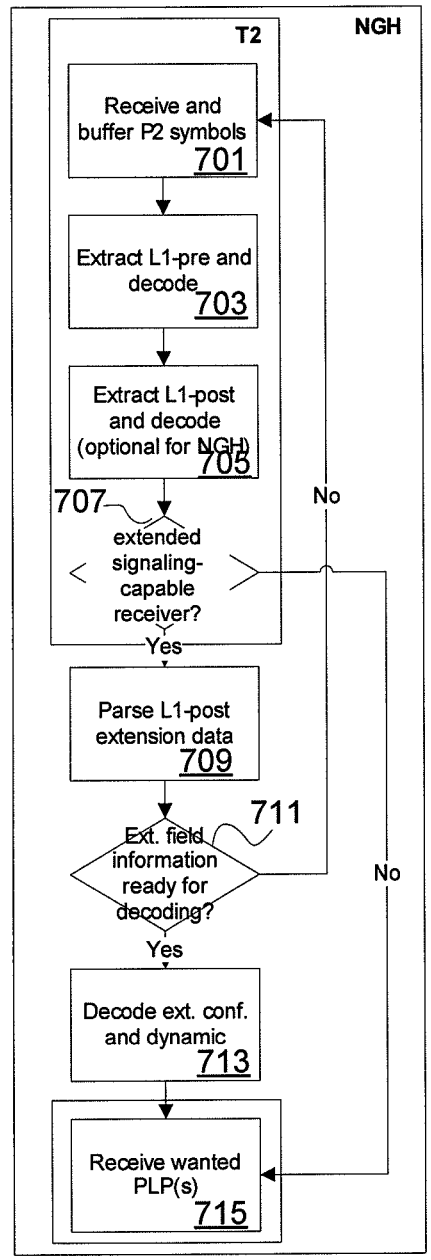
FIG. 7 shows a receiver flow diagram in accordance with an exemplary embodiment of the invention.

FIG. 7 shows receiver flow diagram 700 (corresponding to the reception of transmission shown in FIG. 3) in accordance with an exemplary embodiment of the invention. Both T2 and extended signaling-compatible receivers receive P2 symbols in step 701 and decode the L1 pre-signaling 303 as shown in FIG. 3 in step 703. Decoding configurable signaling data 315 and dynamic signaling data 317 in step 705 may be optional for extended signaling-compatible receivers, since extended signaling services may be signaled in extension field 351. An extended signaling-compatible receiver (as determined by step 707) then collects signaling data contained in extension fields from multiple data frames in step 709 to decode extended signaling in steps 711 and 713. Once dynamic signaling data may be obtained by a T2 receiver or an extended signaling-capable receiver, physical layer pipes (PLPs) can be processed in step 715.

Figure 8:
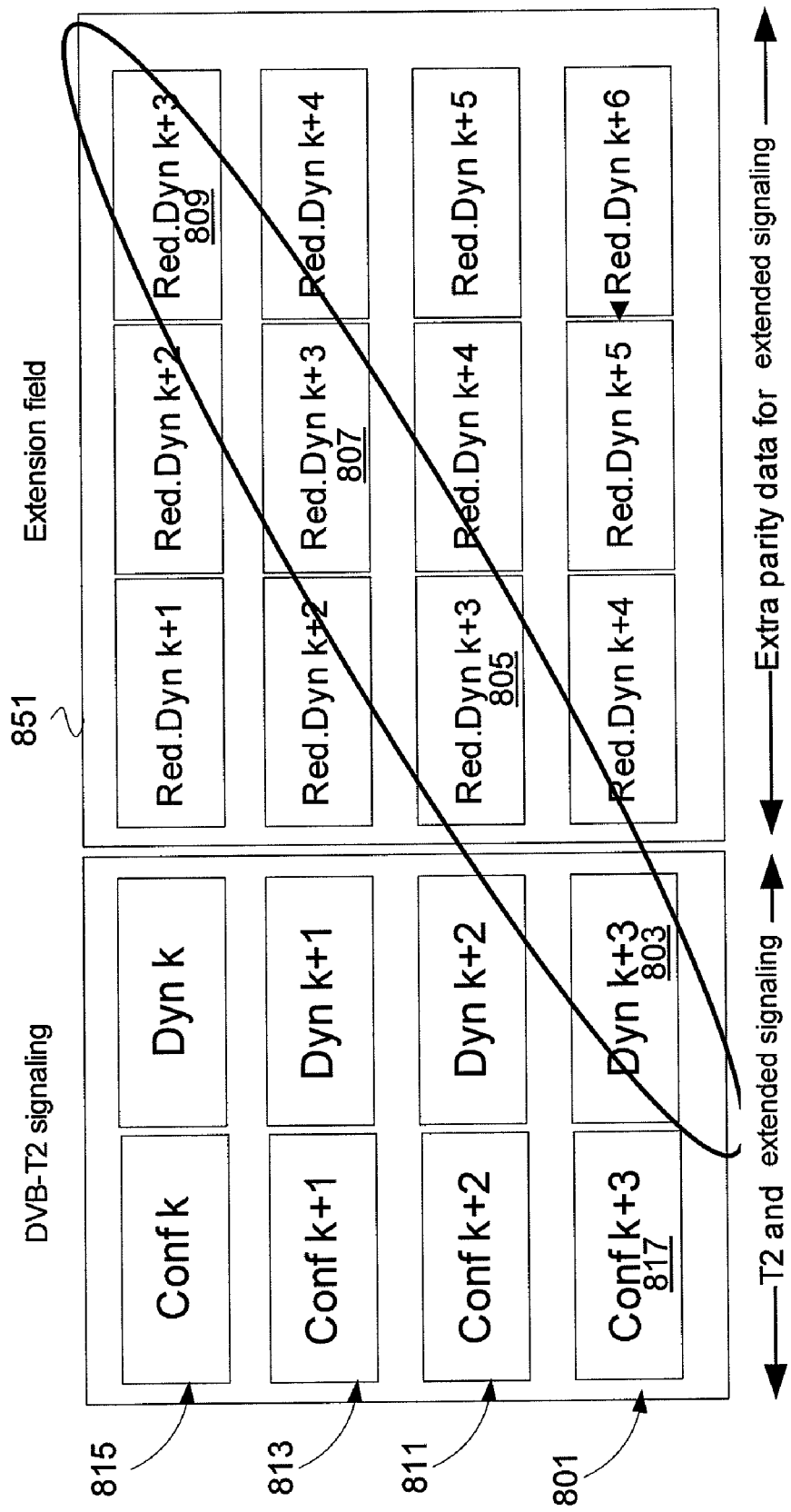
FIG. 8 shows parity (redundancy) data in a L1 post-signaling extension field in accordance with an exemplary embodiment of the invention.
Figure 9:
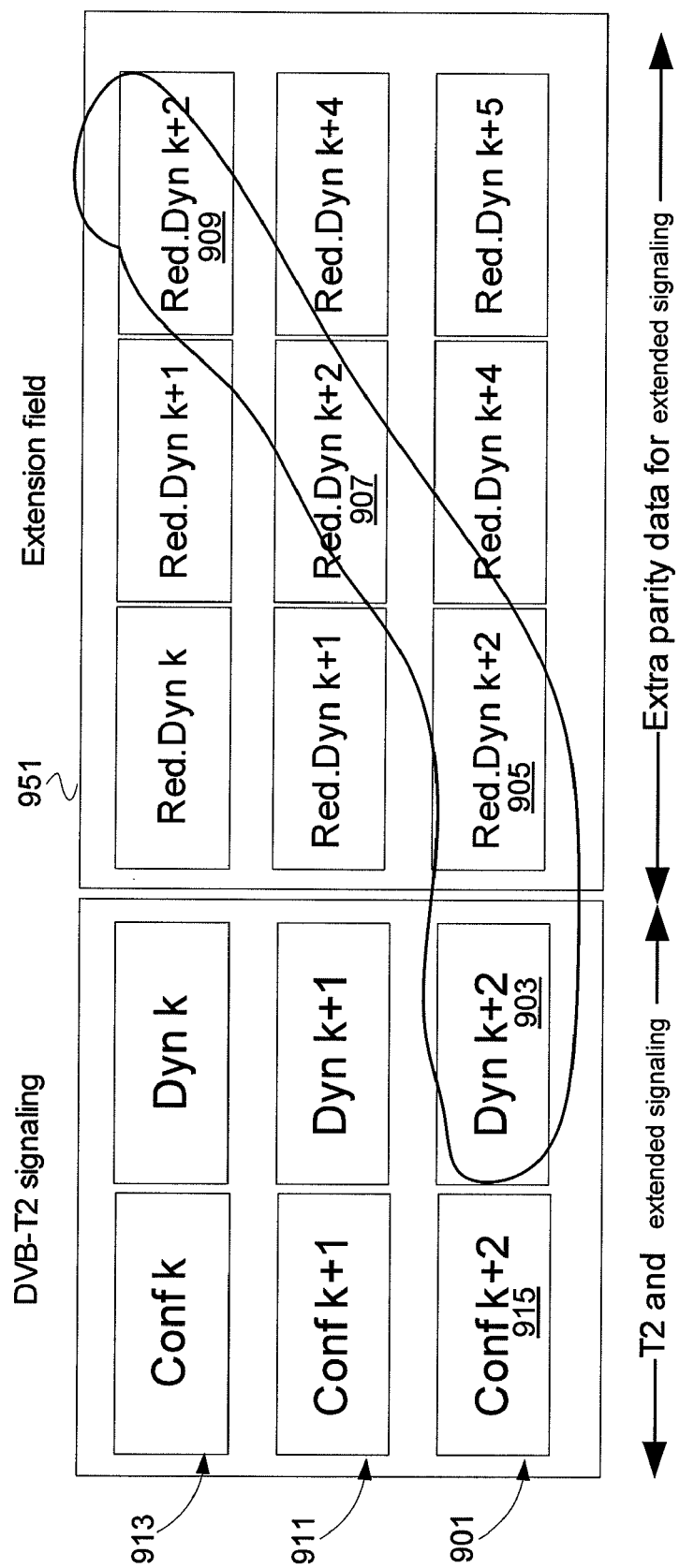
FIG. 9 shows parity (redundancy) data in a L1 post-signaling extension field in accordance with an exemplary embodiment of the invention.
Figure 11:
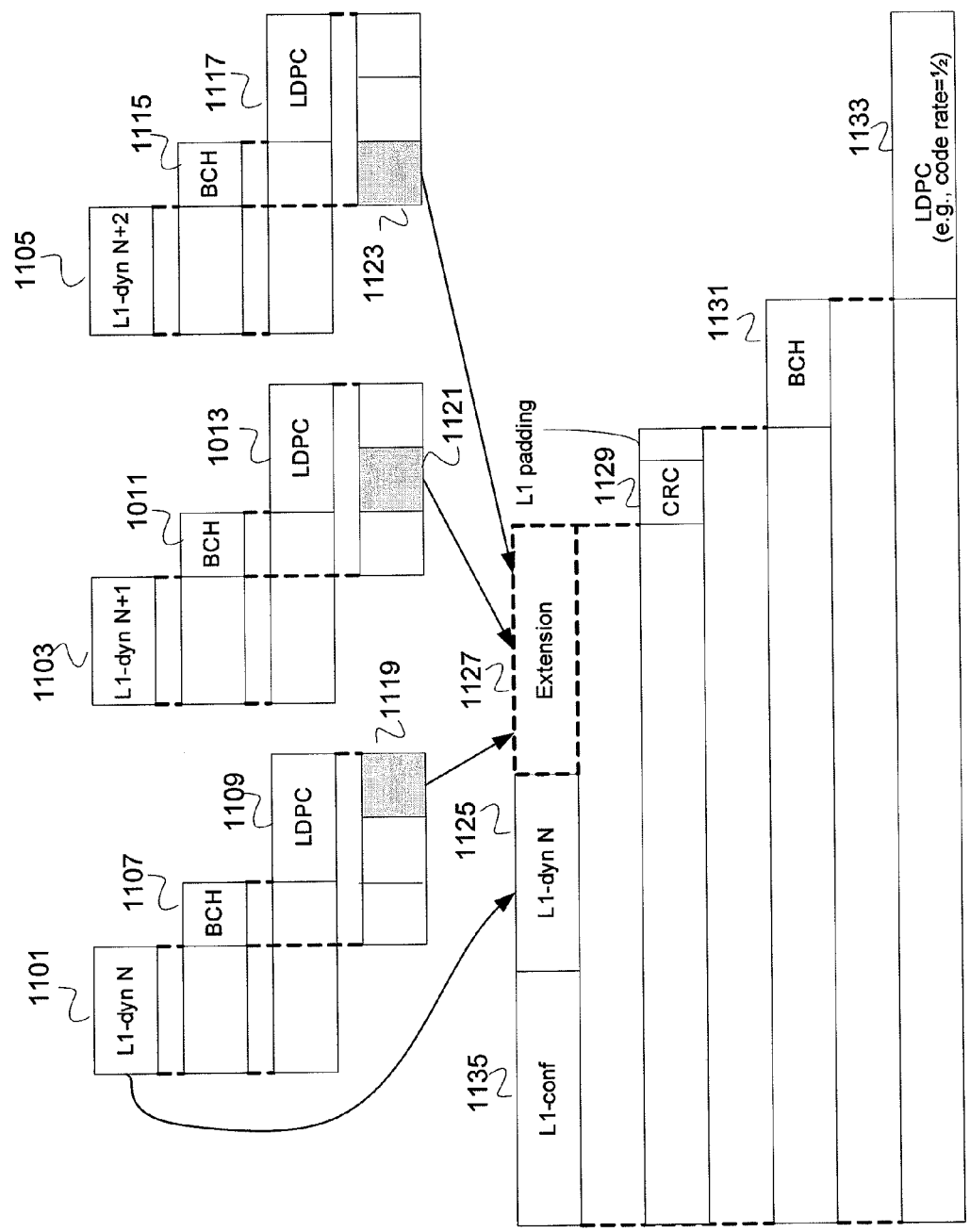
FIG. 11 shows a mapping for signaling as shown in FIG. 9 in accordance with an exemplary embodiment of the invention.

FIG. 8 shows distributed parity (redundancy) data that may be contained in extension field 851 in accordance with an exemplary embodiment of the invention. With an aspect of the invention, only parity data for extended signaling may be distributed over a plurality of data frames. For example, parity data for dynamic signaling in data frame 801 may be divided and distributed in segments 805, 807, and 809 of previously-received data frames 811, 813, and 815, respectively. (Each segment 805, 807, and 809 may contain a portion of the parity data as shown in FIG. 11.) FIG. 9 shows another exemplary embodiment for distributing parity data in extension field 951, where only parity data for extended signaling may be distributed over current frame 901 and previously received data frames 911 and 913 in accordance with an exemplary embodiment of the invention.

Both exemplary embodiments shown in FIGS. 8 and 9 support backward compatibility with traditional DVB-T2 systems, in which signaling for all PLPs may be included. Moreover, additional redundancy data for the dynamic signaling may be contained in extension fields 851 and 951 to enhance the performance of the signaling for the mobile extended signalling-capable receivers. The embodiments shown in FIGS. 8 and 9 may be DVB-T2 backwards compatible, in which signaling for extended signaling services appear as signaling for T2 services. However, only extended signaling-capable receivers (or enhanced T2 receivers) can benefit from the increased robustness. Also, the embodiments shown in FIGS. 8 and 9 support SVC (scalable video coding), where a robust low-bit rate base layer may be transmitted for both T2 and extended signalling-capable receivers, and the quality of T2 video may be improved by transmitting also a less robust enhancement layer. In other words, the base layer destined for both T2 and extended signaling may be transmitted in PLP with low code rate and/or robust modulation, while enhancement layer providing for example HDTV (High Definition Television) destined only to T2 receivers can be transmitted in another PLP with higher code rate and/or less robust modulation.

When the PLPs may be not transmitted in every data frame, the systematic part that may be transmitted within T2 signaling may be repeated. As an example, if a particular PLP may be transmitted in every fourth frame, the current data frame may include the systematic part for the current data frame (k) and for the next data frame that the PLP occurs (for example, k+4). If the signaling for the next frame may be correctly received, the receiver does not need to wake up to receive the extended parity (redundancy).

Figure 10:
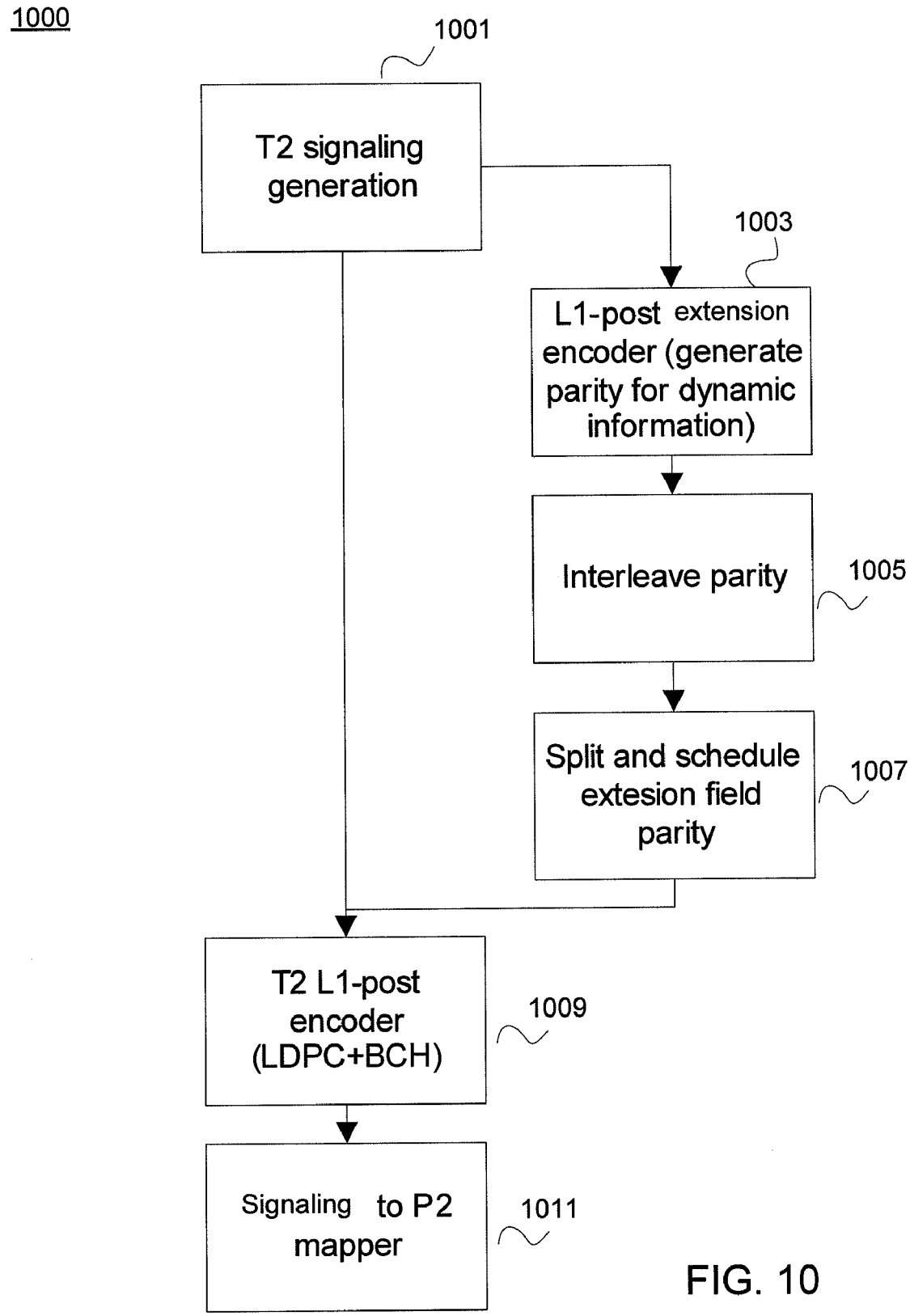
FIG. 10 shows a flow diagram for signaling as shown in FIGS. 8 and 9 in accordance with an exemplary embodiment of the invention.

FIG. 10 shows flow diagram 1000 for signaling as shown in FIGS. 8 and 9 in accordance with an exemplary embodiment of the invention. Flow diagram 1000 supports compatibility with both extended signaling as well as traditional signaling. In step 1001, DVB-T2 signaling may be generated corresponding to fields 817 and 803 and to fields 915 and 903 as shown in FIGS. 8 and 9, respectively. Additional parity (redundancy) data may be generated for dynamic signaling data in steps 1003, 1005, and 1007. In step 1009, parity data (spanning configurable signaling data 1135, dynamic signaling data 1125, and extension data 1127) may be generated in CRC field 1129, BCH field 1131, and LDPC field 1133 as shown in FIG. 11. The encoded signaling data may be subsequently mapped to P2 symbols in step 1011.

FIG. 11 shows a mapping for signaling as shown in FIG. 9 in accordance with an exemplary embodiment of the invention. Dynamic signaling data 1101 corresponds to the first data frame, dynamic signaling data 1103 corresponds to the second consecutive data frame, and dynamic signaling data 1105 corresponds to the third consecutive data frame. Extension field 1127 includes segment 1119 (corresponding to the last part of parity data 1107 and 1109 for dynamic signaling data 1101), segment 1121 (corresponding to the second part of parity data 1111 and 1113 for dynamic signaling data 1103), and segment 1123 (corresponding to the first part of parity data 1115 and 1117 for dynamic signaling data 1105).

Figure 12:
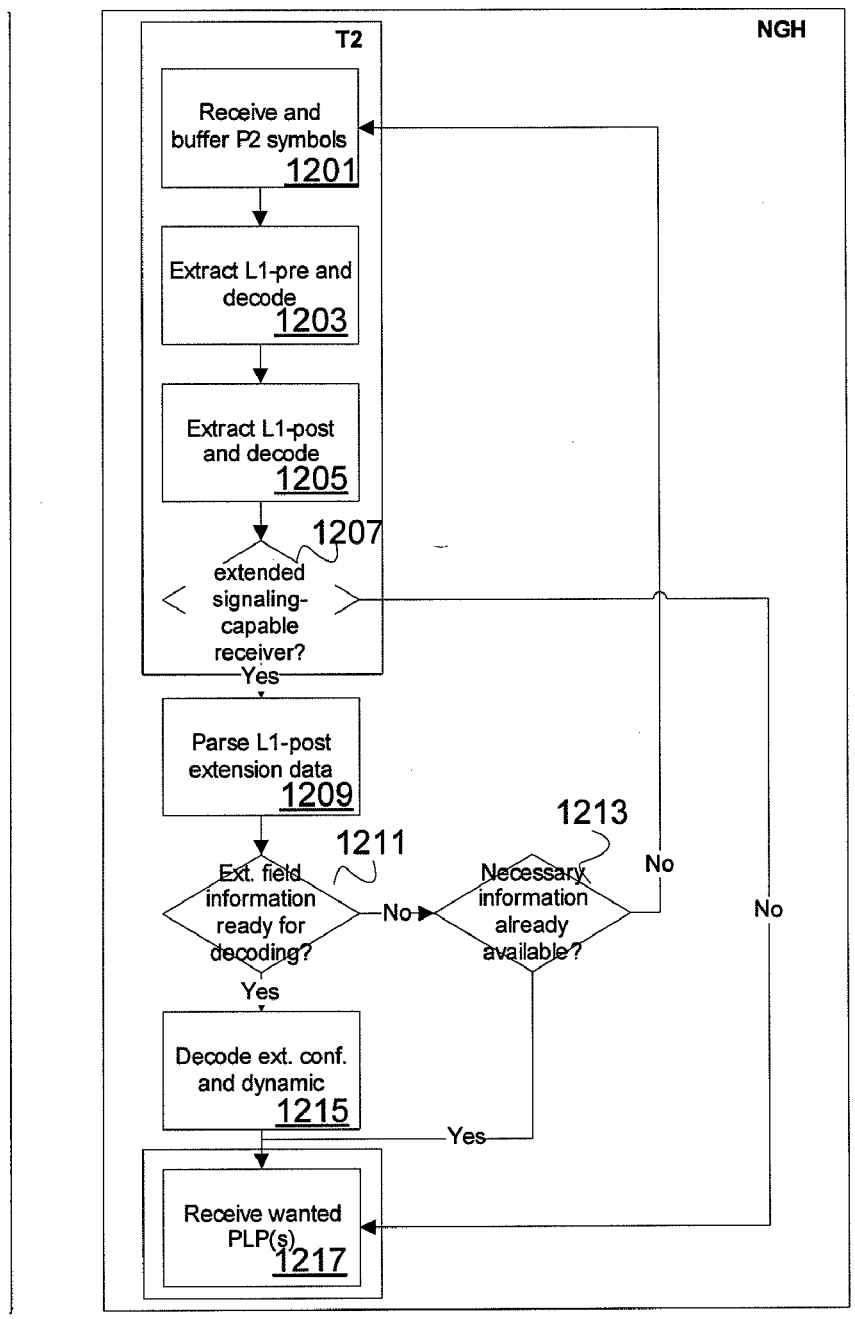
FIG. 12 shows a receiver flow diagram in accordance with an exemplary embodiment of the invention.

FIG. 12 shows receiver flow diagram 1200 (corresponding to the transmission shown in FIGS. 8 and 9) in accordance with an exemplary embodiment of the invention. Both T2 and extended signaling-capable receivers receive P2 symbols in step 1201 and decode the L1 pre-signaling in step 1203. In step 1205, configurable signaling data 1135 and dynamic signaling data 1125 may be extracted and decoded using CRC field 1129, BCH field 1131, and LDPC field 1133 as shown in FIG. 11. If the receiver may be extended signaling-capable, as determined by step 1207, additional redundancy data may be extracted and parsed from extension field 1127 in step 1209.

Step 1211 determines whether the additional redundancy data can be used for decoding the dynamic signaling information in the current data frame, for example whether all parts of the redundancy have been already received. If so, the dynamic signaling data may be decoded in step 1215 using the additional redundancy data. If not, step 1213 determines if the dynamic signaling information was correct and can be used. If systemic part 803 is correctly received, the extra redundancy (segments 805, 807, and 809) is not needed. If the dynamic signaling data can be decoded by step 1215, physical layer pipes (PLPs) can be processed in step 1217.

With the embodiment shown in FIG. 12, decoding the L1 post-signaling may be performed for both T2 and extended signaling-capable receivers because the systematic bits (signaling information) for extended signaling may be in L1 post-signaling field 1125 (not in extension field 1127). Also, the receiver may decide not process the additional redundancy data if the signaling has been already successfully decoded without the additional redundancy data.

Figure 13:
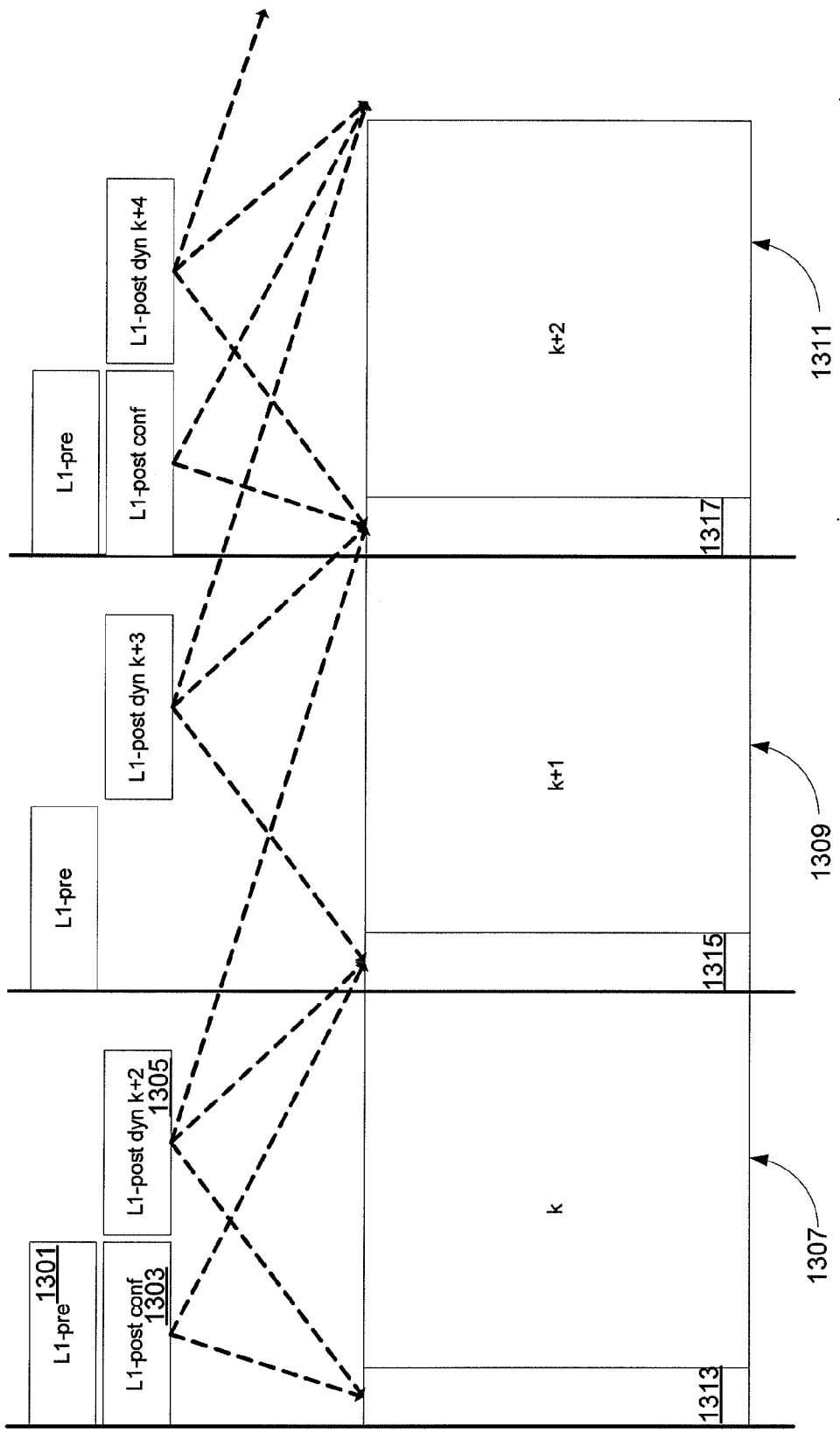
FIG. 13 shows signaling information in an L1 post-signaling field in accordance with an exemplary embodiment of the invention.

FIG. 13 shows further exemplary signaling information in an L1 post-signaling field in accordance with an exemplary embodiment of the invention. However, backwards capability with traditional DVB-T2 signaling may not be supported as with the embodiments as shown in FIGS. 3, 8, and 9. Configurable signaling data 1303 and dynamic signaling data 1305 may be split over several data frames. The configurable and dynamic signaling data can be transmitted directly without embedding the signaling data within DVB-T2 L1 post-signaling code words. For example, both the configurable signaling data and dynamic signaling data may be separately encoded using LDPC and subsequently distributed over a plurality of data frames 1307, 1309, and 1311 and inserted into corresponding P2 symbols 1313, 1315, and 1317. As exemplified in FIG. 13, configurable signaling data 1303 may be transmitted over two data frames and dynamic signaling data 1305 may be split over three data frames. L1 pre-signaling data a 1301 may be transmitted in each data frame.

Figure 14:
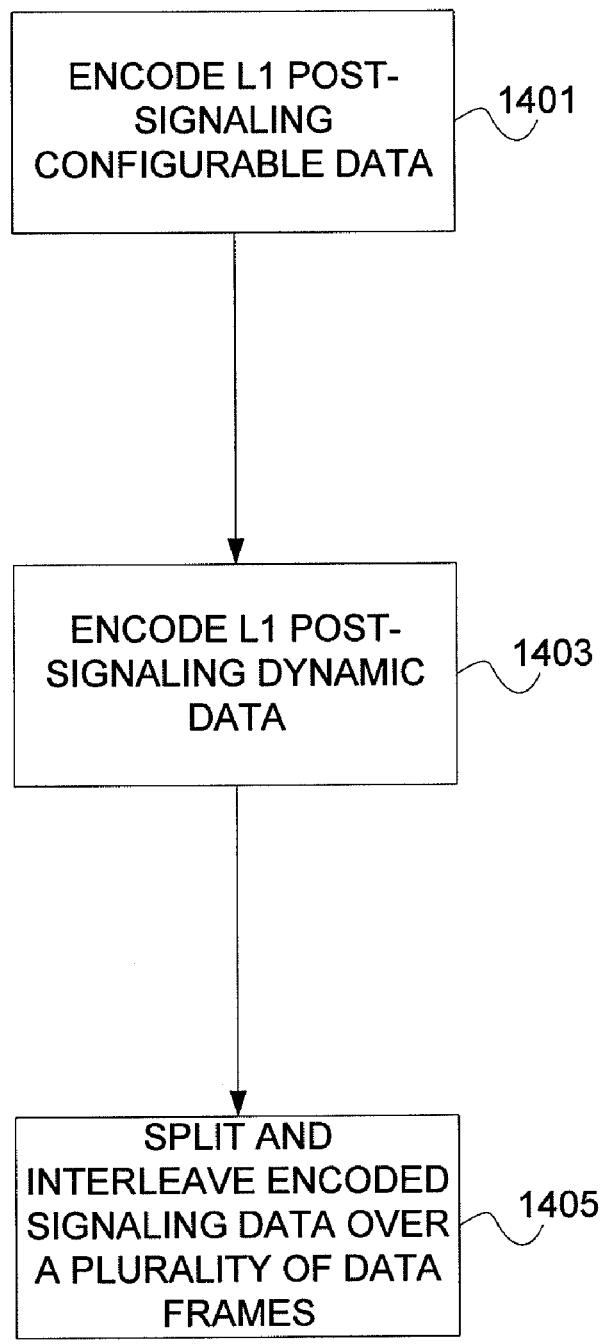
FIG. 14 shows a flow diagram for signaling as shown in FIG. 13 in accordance with an exemplary embodiment of the invention.

FIG. 14 shows flow diagram 1400 for signaling as shown in FIG. 13 in accordance with an exemplary embodiment of the invention. In steps 1401 and 1403, configurable signaling data and dynamic signaling data may be separately encoded. In step 1405, the encoded signaling data may be distributed over a plurality of data frames as shown in FIG. 13.

Figure 15:
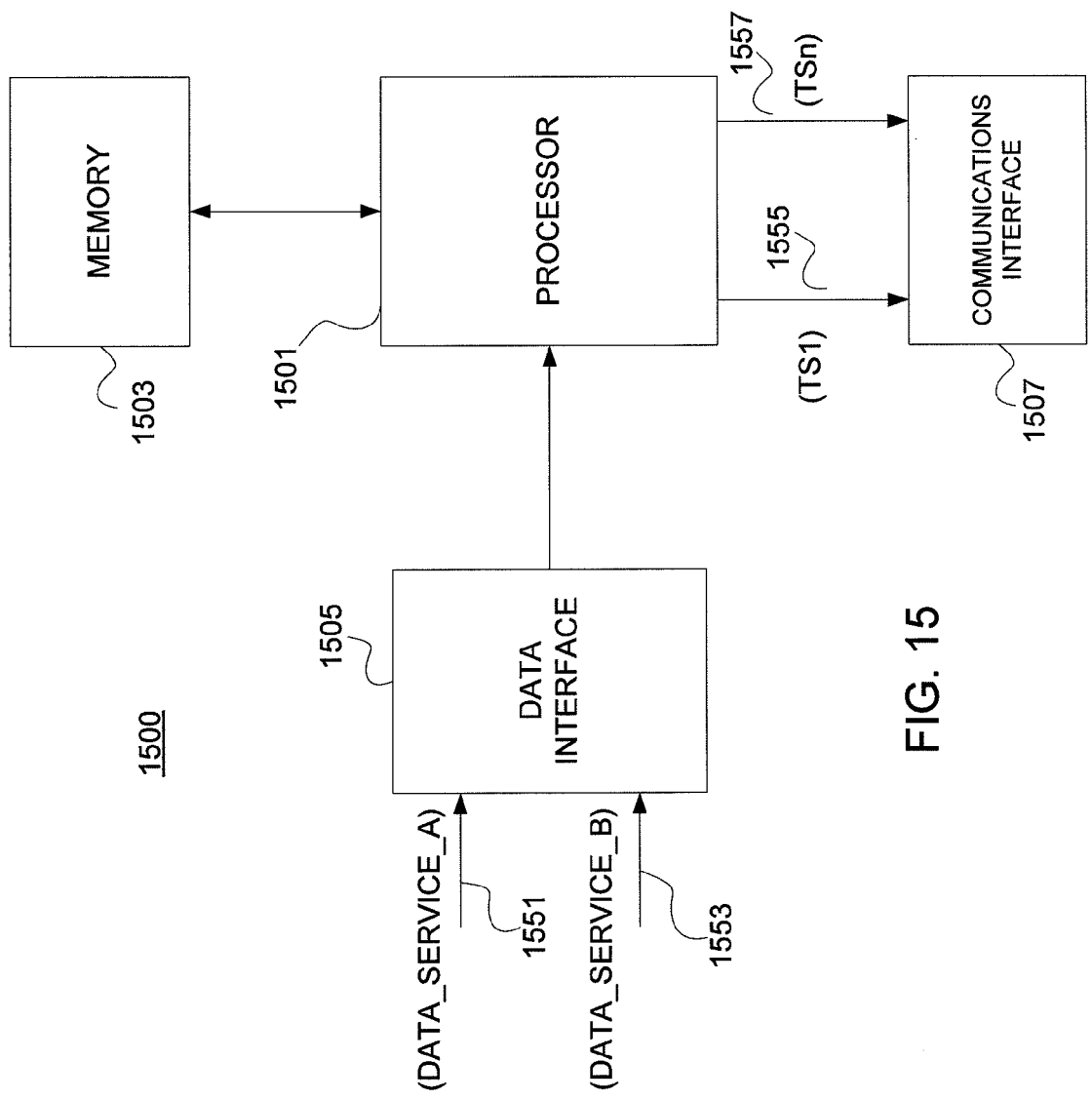
FIG. 15 shows an apparatus for generating a digital stream in accordance with an exemplary embodiment of the invention.

FIG. 15 shows apparatus 1500 for generating a digital stream (for example, as shown in FIG. 3, 8, 9, or 13) in accordance with certain embodiments of the invention. Processor 1501 obtains content 1551, 1553 for services A and B through data interface 1505 and generates a data stream, which may comprise transport streams (TS) 1555 and 1557. (A service may be conveyed in one transport stream, although it may be conveyed in a plurality of transport streams.) The data stream may be transmitted over a communications channel (for example, a digital terrestrial television broadcasting system) through communications interface 1507, which may include one or more transmitters.

Processor 1501 may execute computer executable instructions from a computer-readable medium, for example, memory 1503 in order perform a data transmission process (any or all of the transmission processes described herein). Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 1501. The executable instructions may carry out any or all of the method steps described herein.

Figure 16:
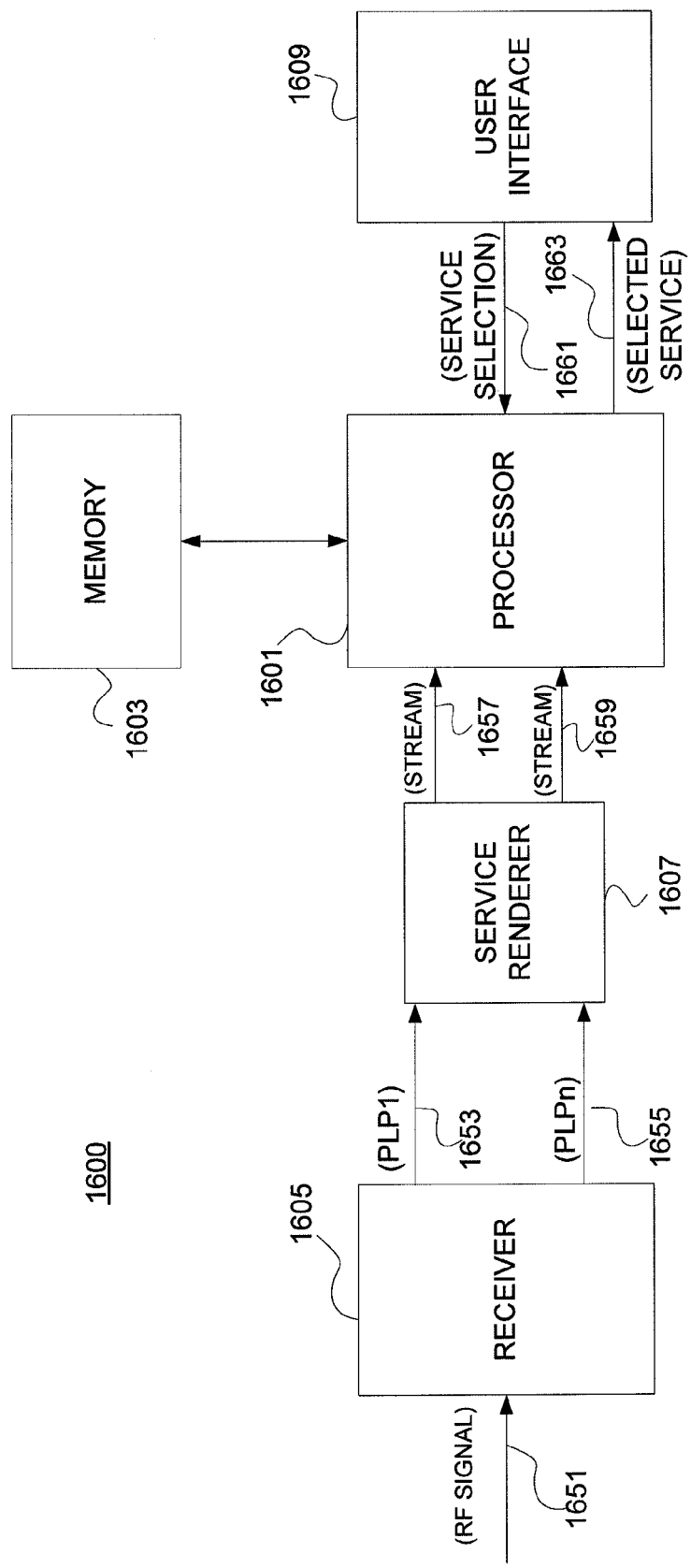
FIG. 16 shows an apparatus for processing a digital stream in accordance with an exemplary embodiment of the invention.

FIG. 16 shows apparatus 1600 for processing a digital stream in accordance with some embodiments of the invention (any or all of the reception processes described herein). Receiver 1605 processes RF signal 1651, for example, a digital terrestrial television broadcast signal, to obtain PLPs 1653 and 1655. Service renderer 1607 forms streams 1657 and 1659 for selected services from PLPs 1653 and 1655 based on service selection 1661. Service selection 1661 may be determined from a user (not shown) choosing a service through user interface 1609 and processor 1601. Processor 1601 then consequently provides service data 1663 to user interface 1609.

A user (not shown) chooses a service through user interface 1609 to generate service selection indication 1661 to processor 1601. Accordingly, processor 1601 selects PLPs 1657 and 1659 that may be associated with the selected service in order to render the service on device 1607.

Processor 1601 may execute computer executable instructions from a computer-readable medium, for example, memory 1603 as described above in connection with FIG. 15.

While the invention has been described with respect to specific examples including presently modes of carrying out the invention, those skilled in the art will appreciate that there may be numerous variations and permutations of the above described systems and techniques that fall within the spirit and scope of the exemplary embodiments of the invention as set forth in the appended claims.

We claim:

1. A method comprising:
    obtaining signaling data for a current data frame of a plurality of data frames, the signaling data for the current data frame comprising a dynamic signaling part, wherein the signaling data contains parameters for decoding a data stream and the dynamic signaling part included in the signaling data for the current data frame is susceptible to change from a dynamic signal part included in signaling data for other frames in the plurality of data frames;
    encoding, with a processor, the dynamic signaling part of the signaling data for the current data frame to generate a redundancy data field;
    dividing the redundancy data field into a plurality of redundancy data segments;
    inserting one redundancy data segment of the plurality of redundancy data segments into the current data frame;
    inserting at least one other redundancy data segment of the plurality of redundancy data segments into an extension part located after the dynamic signaling part included in the signaling data in at least one of the other data frames prior to the current data frame; and
    outputting the plurality of data frames.

2. The method of claim 1, further comprising:
    activating a signaling indicator when the at least one other redundancy data segment is inserted into the extension part.

3. The method of claim 1, wherein the signaling data for the current data frame further comprises a static signaling part and wherein the static signaling part is the same as respective static signaling parts included in the signaling data for the other frames in the plurality of data frames, the method further comprising:
encoding the static signaling part included in the signaling data for the current data frame into an extended static signaling part;
dividing the extended static signaling part into a plurality of extended static signaling segments; and
distributing the plurality of extended static signaling segments over the plurality of data frames.

4. The method of claim 1, wherein the plurality of data frames comprises consecutive data frames.

5. The method of claim 4, wherein the consecutive data frames comprise the current data frame and two previous data frames and wherein the dynamic signaling part of the current data frame is indicative of physical layer pipes associated with the current data frame.

6. The method of claim 1, further comprising:
dividing the dynamic signaling part of the current data frame into a plurality of dynamic signaling segments; and
distributing the dynamic signaling segments over the plurality of data frames.

7. The method of claim 6, further comprising:
interleaving the plurality of dynamic signaling segments.

8. The method of claim 1, wherein the plurality of redundancy data segments together result from the encoding using a common error correction code calculation applied to the dynamic signaling part of the signaling data for the current data frame.

9. An apparatus comprising:
a processor; and
a memory having stored therein machine executable instructions, that when executed, cause the apparatus to:
obtain signaling data for a current data frame of a plurality of data frames, the signaling data for the current data frame comprising a dynamic signaling part, wherein the signaling data contains parameters for decoding a data stream and the dynamic signaling part included in the signaling data for the current data frame is susceptible to change from a dynamic signal part included in signaling data for other frames in the plurality of data frames;
encode the dynamic signaling part of the signaling data for the current data frame to generate a redundancy data field;
divide the redundancy data field into a plurality of redundancy data segments;
insert one redundancy data segment of the plurality of redundancy data segments into the current data frame;
insert at least one other redundancy data segment of the plurality of redundancy data segments into an extension part located after the dynamic signaling part included in the signaling data in at least one of the other data frames prior to the current data frame; and
output the plurality of data frames.

10. The apparatus of claim 9, wherein the instructions, when executed, further cause the apparatus to:
activate a signaling indicator when the at least one other redundancy data segment is inserted into the extension part.

11. The apparatus of claim 9, wherein the signaling data for the current data frame further comprises a static signaling part and wherein the static signaling part is the same as respective static signaling parts included in the signaling data for the other frames in the plurality of data frames, and wherein the instructions, when executed, further cause the apparatus to:
encode the static signaling part included in the signaling data for the current data frame into an extended static signaling part;
divide the extended static signaling part into a plurality of extended static signaling segments; and
distribute the plurality of extended static signaling segments over the plurality of data frames.

12. The apparatus of claim 9, wherein the instructions, when executed, further cause the apparatus to:
divide the dynamic signaling part of the current data frame into a plurality of dynamic signaling segments; and
distribute the dynamic signaling segments over the current data frame and the at least one of the other data frames prior to the current data frame.

13. The apparatus of claim 12, wherein the instructions, when executed, further cause the apparatus to interleave the plurality of dynamic signaling segments.

14. The apparatus of claim 9, wherein the plurality of redundancy data segments together result from the encoding using a common error correction code calculation applied to the dynamic signaling part of the signaling data for the current data frame.

15. A non-transitory computer-readable medium having computer-executable instructions stored therein, that when executed, cause an apparatus to:
obtain signaling data for a current data frame of a plurality of data frames, the signaling data for the current data frame comprising a dynamic signaling part, wherein the signaling data contains parameters for decoding a data stream and the dynamic signaling part included in the signaling data for the current data frame is susceptible to change from a dynamic signal part included in signaling data for other frames in the plurality of data frames;
encode the dynamic signaling part of the signaling data for the current data frame to generate a redundancy data field;
divide the redundancy data field into a plurality of redundancy data segments;
insert one redundancy data segment of the plurality of redundancy data segment into the current data frame;
insert at least one other redundancy data segment of the plurality of redundancy data segments into an extension part located after the dynamic signaling part included in the signaling data in at least one of the other data frames prior to the current data frame; and
output the plurality of data frames.

16. The non-transitory computer-readable medium of claim 15, wherein the instructions, when executed, further cause the apparatus to:
activate a signaling indicator when the at least one other redundancy data segment is inserted into the extension part.

17. The non-transitory computer-readable medium of claim 15, wherein the signaling data for the current data frame further comprises a static signaling part, wherein the static signaling part is the same as respective static signaling parts included in the signaling data for the other frames in the plurality of data frames, and wherein the instructions, when executed, further cause the apparatus to:
encode the static signaling part included in the signaling data for the current data frame into an extended static signaling part;
divide the extended static signaling part into a plurality of extended static signaling segments; and distribute the plurality of extended static signaling segments over the plurality of data frames.

18. The non-transitory computer-readable medium of claim 15, wherein the instructions, when, further cause the apparatus to:
divide the dynamic signaling part into a plurality of dynamic signaling segments; and
distribute the dynamic signaling segments over the current data frame and the at least one of the other data frames prior to the current data frame.

19. The non-transitory computer-readable medium of claim 18, wherein the instructions, when executed, further cause the apparatus to interleave the plurality of dynamic signaling segments.

20. The non-transitory computer-readable medium of claim 15, wherein the plurality of redundancy data segments together result from the encoding using a common error correction code calculation applied to the dynamic signaling part of the signaling data for the current data frame.

21. A method comprising:
receiving a current data frame of a plurality of data frames, each data frame including signaling data;
extracting from the signaling data of the current data frame a dynamic signaling part including a redundancy data segment;
extracting from at least one prior data frame of the plurality of data frames an additional redundancy data segment located in an extension part after a dynamic signaling part of the at least one prior data frame;
combining the redundancy data segment and additional redundancy data segment to decode the dynamic signaling part from the current data frame to obtain dynamic signaling information; and
using the dynamic signaling information to decode, with a processor, data symbols contained in the current data frame.

22. The method of claim 21, wherein the plurality of data frames comprises consecutive data frames.

23. The method of claim 22, wherein the consecutive data frames comprise the current data frame and two previous data frames and wherein the dynamic signaling part of the current data frame is indicative of physical layer pipes associated with the current data frame.

24. The method of claim 21, wherein extracting the additional redundancy data segment is performed in response to detecting, in the at least one prior data frame, a signaling indicator indicating presence of the additional redundancy data segment.

25. The method of claim 21, wherein the dynamic signaling part of the current data frame comprises a plurality of dynamic signaling segments distributed over the current data frame and the at least one prior data frame.

26. The method of claim 25, further comprising deinterleaving the plurality of dynamic signaling segments.

27. The method of claim 21, wherein the signaling data in each data frame further comprises a static signaling part, and wherein the static signaling part does not change over the plurality of data frames, the method further comprising:
extracting and combining a plurality of extended static signaling segments from the signaling data of the plurality of data frames; and
decoding the static signaling part of the current data frame using the combination of extended static signaling segments to obtain static signaling information.

28. An apparatus comprising:
a processor; and
a memory having stored therein machine executable instructions, that when executed, cause the apparatus to:
receive a current data frame of a plurality of data frames, each data frame including signaling data;
extract from the signaling data of the current data frame a dynamic signaling part including a redundancy data segment;
extract from at least one prior data frame of the plurality of data frames an additional redundancy data segment located in an extension part after a dynamic signaling part of the at least one prior data frame;
combine the redundancy data segment and additional redundancy data segment to decode the dynamic signaling part from the current data frame to obtain dynamic signaling information; and
use the dynamic signaling information to decode data symbols contained in the current data frame.

29. The apparatus of claim 28, wherein the instructions, when executed, further cause the apparatus to:
detect, in the at least one prior data frame, a signaling indicator indicating presence of the additional redundancy data segment; and
in response to detecting the signaling indicator, extracting the additional redundancy data segment.

30. The apparatus of claim 28, wherein the dynamic signaling part of the current data frame comprises a plurality of dynamic signaling segments distributed over the current data frame and the at least one prior data frame.

31. The apparatus of claim 30, wherein the instructions, when executed, further cause the apparatus to deinterleave the plurality of dynamic signaling segments.

32. The apparatus of claim 28, wherein the signaling data in each data frame further comprises a static signaling part, wherein the static signaling part does not change over the plurality of data frames, and wherein the instructions, when executed, further cause the apparatus to:
extract and combine a plurality of extended static signaling segments from the signaling data of the plurality of data frames; and
decode the static signaling part of the current data frame using the combination of extended static signaling segments to obtain static signaling information.

33. A non-transitory computer-readable medium having computer-executable instructions stored therein, that when executed, cause an apparatus:
receive a current data frame of a plurality of data frames, each data frame including signaling data;
extract from the signaling data of the current data frame a dynamic signaling part including a redundancy data segment;
extract from at least one prior data frame of the plurality of data frames an additional redundancy data segment located in an extension part after a dynamic signaling part of the at least one prior data frame;
combine the redundancy data segment and additional redundancy data segment to decode the dynamic signaling part from the current data frame to obtain dynamic signaling information; and
use the dynamic signaling information to decode data symbols contained in the current data frame.

34. The non-transitory computer readable medium of claim 33, wherein extracting the additional redundancy data segment is performed in response to detecting, in the at least one prior data frame, a signaling indicator indicating presence of the additional redundancy data segment.

35. The non-transitory computer readable medium of claim 33, wherein the dynamic signaling part of the current data frame comprises a plurality of dynamic signaling segments distributed over the current data frame and the at least one prior data frame.

36. The non-transitory computer readable medium of claim 35, wherein the instructions, when executed, further cause the apparatus to deinterleave the plurality of dynamic signaling segments.

37. The non-transitory computer readable medium of claim 33, wherein the signaling data in each data frame further comprises a static signaling part, wherein the static signaling part does not change over the plurality of data frames, and wherein the instructions, when executed, further cause the apparatus to:

extract and combine a plurality of extended static signaling segments from the signaling data of the plurality of data frames; and decode the static signaling part of the current data frame using the combination of extended static signaling segments to obtain static signaling information.

\* \* \* \* \*